United States Patent [19]
Stephan

[11] 3,803,020
[45] Apr. 9, 1974

[54] CONTAINER FOR CARRYING OUT QUANTITATIVE IMMUNO-ELECTROPHORESIS

[75] Inventor: Wolfgang Stephan, Neu-Isenburg, Germany

[73] Assignee: Biotest-Serum-Institut GmbH, Frankfurt/Main, Germany

[22] Filed: Aug. 14, 1972

[21] Appl. No.: 280,292

[30] Foreign Application Priority Data
Aug. 12, 1971 Germany............................ 2140417

[52] U.S. Cl............................. 204/299, 204/180 G
[51] Int. Cl............................................. B01k 5/00
[58] Field of Search....................... 204/180 G, 299

[56] References Cited
UNITED STATES PATENTS

| | | | |
|---|---|---|---|
| 3,432,424 | 3/1969 | Zec.................................... | 204/299 |
| 3,482,943 | 12/1969 | Csizmas et al.................. | 204/299 X |
| 3,616,387 | 10/1971 | Siebert et al..................... | 204/180 G |
| 3,620,947 | 11/1971 | Allen et al. ..................... | 204/180 G |
| 3,622,484 | 11/1971 | Cawley ............................ | 204/180 G |

*Primary Examiner*—John H. Mack
*Assistant Examiner*—A. C. Prescott
*Attorney, Agent, or Firm*—Burgess, Dinklage & Sprung

[57] ABSTRACT

A container for the storage of separating gel and antibody gel comprising a transparent lower portion and a tightly fitting removable lid, wherein the lower portion is divided internally into a smaller chamber containing the separating gel and a larger chamber containing antibody gel is advantageously used for carrying out two-dimensional quantitative immuno-electrophoresis on serum specimens.

5 Claims, 3 Drawing Figures

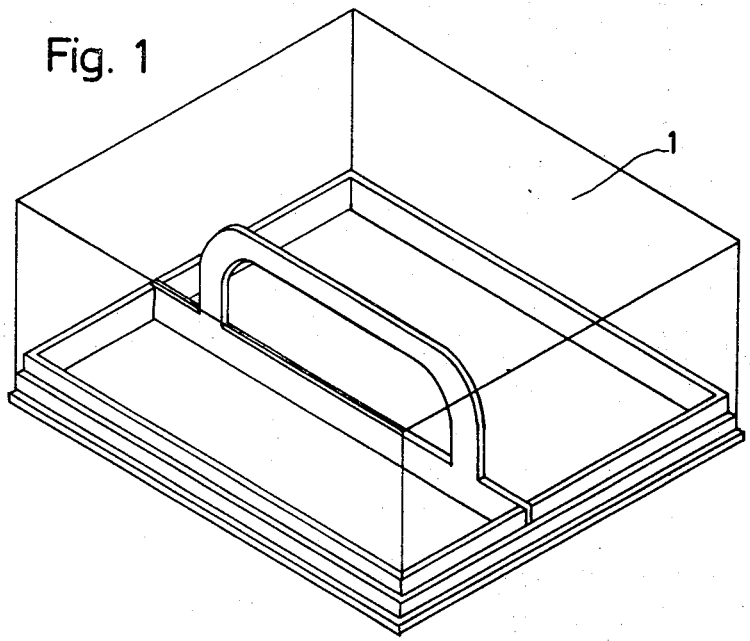
Fig. 1
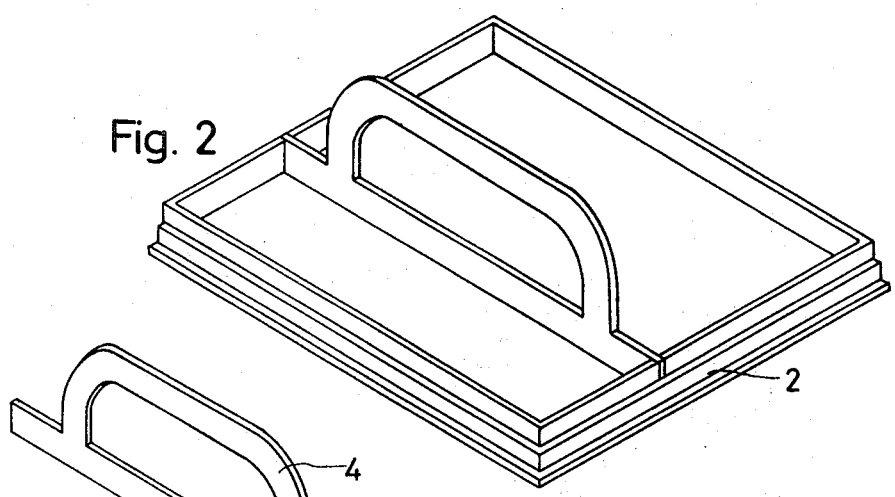
Fig. 2
Fig. 3
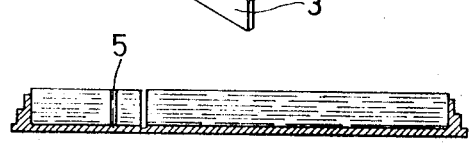

CONTAINER FOR CARRYING OUT QUANTITATIVE IMMUNO-ELECTROPHORESIS

The invention relates to a container for use in, and to a method for performing, clinical diagnoses. More specifically, the invention relates to a container for the storage of separating gel and antibody gel and to a method for carrying out a two-dimensional quantitative immuno-electrophoresis.

As is known, antigens are substances, usually proteins, which cause the formation of antibodies in an organism. Antigens then react with antibodies to form a precipitate which is called the immunizing precipitate. For use in the determination of antigens, vessels made of transparent materials are available, in which the bottom plate is divided parallel to the raised sides of the vessel, into an inner chamber which can accommodate a moist sponge, and an outer chamber which is coated with a support containing antiserum. Using this arrangement, it is only possible to carry out a special antigen determination with the use of specific antisera.

For the quantitative determination present proteins, a determination which plays regenerating large part in clinical diagnosis, the immuno-electrophoresis (two-dimensional immuno-electrophoresis) developed in recent years has become increasingly important. Using this method, it is possible for each antigen of an antigen mixture, for example, serum proteins or proteins of other body liquids, to be successfully determined quantitatively at the same time in a single analysis, this temperature. it possible to dispense with the use of specific antisera. The electrophoretic HC1 differentiation of the antigen mixture permits the use of readily available polyvalent antisera.

The principle of quantitative immuno-electrophoresis is as follows. The proteins of an antigen mixture are separated by a first electrophoretic step (first dimension) in agar-agar, agarose or another separating gel. In a second electrophoretic step (second dimension), the separated antigens migrate into a gel containing antibodies and thus immunising precipitation occurs. Precipitation peaks are formed and the height of each peak is proportional to the antigen concentration. An essential preliminary condition for the success of this method is that no antibodies from the antibody-containing gel (second dimension) diffuse into the separating gel of the first dimension, since otherwise, immunising precipitation occurs, during the first electrophoretic separation, which makes a quantitative evaluation impossible. This has previously been prevented by the antibody-containing gel being poured immediately before the second electrophoretic step, onto the gel strip of the first electrophoretic separation.

This known process, which also requires the preparation of the antibody-containing gel, is complicated and is unsuitable for routine investigations.

The present invention provides a container for the storage of a separating gel and an antibody gel and for use in carrying out a two dimensional quantitative immuno electrophoresis, comprising a transparent lower portion having tightly fitting removably transparent lid, the lower portion being divided internally into a smaller chamber and a larger chamber by a removable partition, the smaller chamber containing the separating gel and the larger chamber holding the antibody gel.

The invention also provides a method of assaying the antigenic activity of sera involving the use of a container according to the invention. In a preferred form the process comprises the steps of introducing a serum specimen into the separating gel of the container, the partition having been previously removed, effecting an electrophoretic separation of the serum, filling at least a portion of the gap between the separating gel and the antibody gel with liquid separating gel, effecting a further electrophoretic separation of the serum to obtain a precipitate in the liquid gel, whereby the antigenic activity of the serum can be assayed.

There is also provided, as a preferred embodiment a process for determining antigens by means of antiserum, comprising the steps of removing the lid from a container of the invention removing the partition from the container, introducing a serum specimen into a preformed hole in the separating gel, making a connection to the electrophoresis buffer in the electrophoresis chamber by means of electrolyte bridges and effecting an electrophoretic separation, filling the gap between the separating gel, again making a connection to the buffer in the electrophoresis chamber with electrolyte bridges, and effecting a second electrophoresis, and obtaining a required immunizing precipitate.

In a preferred embodiment of the invention, the container has base dimensions of approximately 10 × 10 cm, and more preferably 5 × 5 cm. It is preferred that the removable partition divides the container into two adjacent (contiguous) chambers.

According to another feature of the invention, an opening for the invention of the serum specimen is provided in the separating gel, preferably in the form of a hole in the gel produced by stamping or other means.

The container according to the invention enables separating gel (first dimension) ready for use and antibody gel (second dimension) ready for use to be stored side-by-side for a relatively long time without there being any diffusion of anti-bodies from the second dimension into the first dimension. A moisture-holding sponge is advantageously disposed on the inside in the tightly closing cover of the mould.

Most of the known transparent container materials, especially the thermoplastic synthetic plastics materials, preferably polyolefines such as polyethylene, polypropylene and polystyrene or polyvinyl chloride, are suitable for the manufacture of the container according to the invention.

Any gel which is conventionally used in electrophoresis can be used, although agarose and antibody agarose are preferred.

The invention is further illustrated by reference to the accompanying drawing, which shows a preferred embodiment of the invention.

FIG. 1 is a perspective view of a container according to the invention.

FIG. 2 is a perspective view of a lower part of the container, showing a partition element.

FIG. 5 is a cross-section through the lower part 2 of the container, showing gel layers and a hole which has been formed in the layer of separating gel.

For the quantitative investigation of the serum specimen to detect antigens with a polyvalent antiserum using the container according to the invention, the preferred procedure is as follows:

Referring to the drawings, after removing a container lid 1 from a lower portion 2 of a container, a removable partition 3 between separating gel (in the left chamber) and antibody gel (in the right chamber) is removed by means of the handle 4. A serum specimen is introduced into a hole 5 in the separating gel, which hole has been previously stampled therein or produced in some other way, and a connection to an electrophoresis buffer is made by conventional electrolyte bridges, preferably paper strips, which are not shown. After carrying out the electrophoretic separation, the gap formed between separating gel and antibody gel upon removal of the partition, is filled with liquid separating gel. The connection to the buffer is then produced by way of conventional electrolyte bridges and the second electrophoresis HC1 is carried out, which leads to the precipitation of the immune deposit. The result of the analysis is judged after 1 to 25 hours.

The container according to the invention can be introduced without any difficulty into the normal commercial electrophoresis chambers.

It will be understood that the specification and examples are illustrative but not limitative of the present invention and that other embodiments within the spirit and scope of the invention will suggest themselves to those skilled in the art.

What is claimed is:

1. Container for the storage of a separating gel and an antibody gel and for use in carrying out a two dimensional quantitative immuno electrophoresis, comprising a transparent lower portion having a tightly fitting removable transparent lid, the lower portion being divided internally into a smaller chamber and a large chamber by a removable partition, wherein the smaller chamber contains the separating gel and the larger chamber holds the antibody gel.

2. Container as claimed in claim 1 in which adjacent chambers are formed by the partition.

3. Container as claimed in claim 1 in which the container has a circular base.

4. Container as claimed in claim 1 in which the container has a rectangular base.

5. Container as claimed in claim 2 in which an opening for the introduction of a serum specimen exists in the separating gel.

* * * * *

UNITED STATES PATENT OFFICE
CERTIFICATE OF CORRECTION

Patent No. 3,803,020               Dated   April 9, 1974

Inventor(s)   Wolfgang Stephan

It is certified that error appears in the above-identified patent and that said Letters Patent are hereby corrected as shown below:

| | |
|---|---|
| Column 1, line 22 | "present" should read -- of -- |
| Column 1, line 23 | "regenerating" should read -- a -- |
| Column 1, line 30 | "temperature" should read -- making -- |
| Column 1, line 32 | "HCl" should not be there. |
| Column 3, line 16 | "HCl" should not be there. |
| Column 4, line 20 | "claim 2" should be -- claim 1 -- (since claim 2 in applicati became claim 1 of patent). |

Signed and sealed this 3rd day of December 1974.

(SEAL)
Attest:

McCOY M. GIBSON JR.
Attesting Officer

C. MARSHALL DANN
Commissioner of Patents